June 20, 1933.  H. L. DAHNEKE  1,914,769
AUTO JACK
Filed Nov. 28, 1928
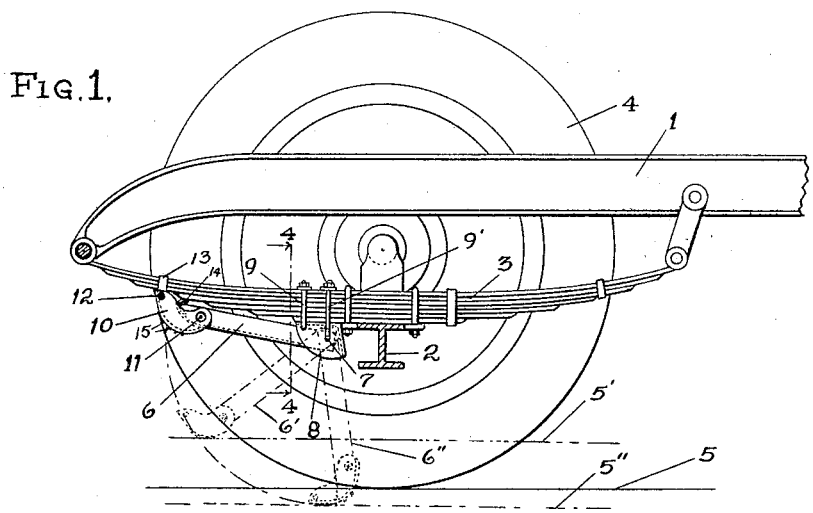
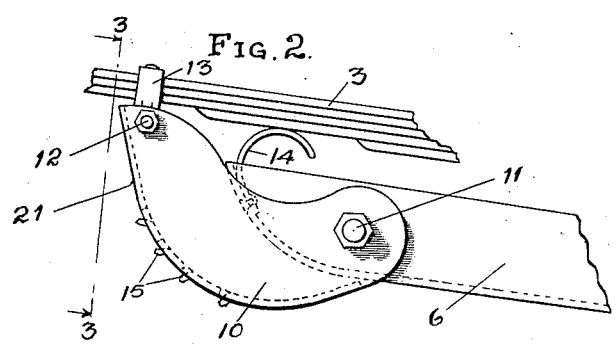
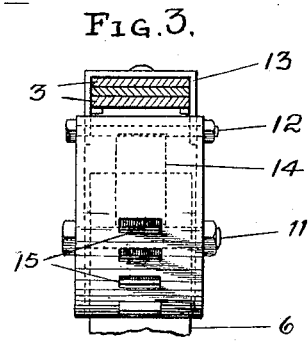
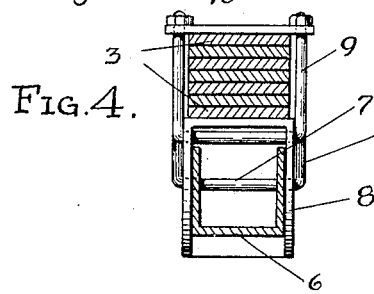
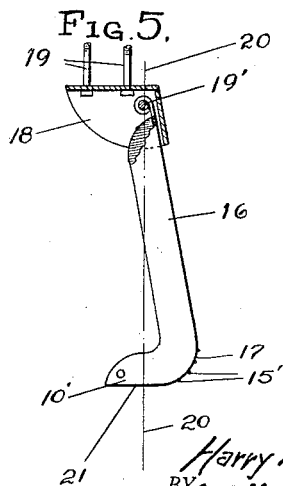
INVENTOR.
Harry L. Dahneke.
BY Miller Boyken & Bried
ATTORNEYS.

Patented June 20, 1933

1,914,769

UNITED STATES PATENT OFFICE

HARRY L. DAHNKE, OF SAN FRANCISCO, CALIFORNIA

AUTO JACK

Application filed November 28, 1928. Serial No. 322,358.

This invention relates to means whereby any of the wheels of an automobile may be jacked up or lifted from the ground by the power of the engine of the machine, also such means carried by the automobile and always in position thereon for quickly bringing into action in case of necessity, such as for removing or pumping up a tire. Also such a device which will be simple, cheap to manufacture, and low in cost, which may be easily attached to any automobile, and which will not detract from the appearance thereof.

Other advantages of my invention will be explained in the following specification in connection with the drawing accompanying the same.

Briefly described my invention comprises a relatively short leg or arm adapted to be pivotally attached to the machine adjacent each wheel thereof, in a manner so that it will swing from a horizontal to a vertical position, and when in a vertical position will be of a length to raise the adjacent wheel from off the ground so that the tire may be removed or inflated.

In the drawing, Fig. 1 is a fragmentary elevation of the front portion of an automobile showing one front wheel and its spring suspension, with my jack arm pivotally mounted in place on the road spring. Fig. 2 is an enlarged view of the front portion of the device showing its detachable suspension at the front end to the spring. Fig. 3 is a cross section of Fig. 2 as seen from the lines 3—3 thereof. Fig. 4 is an enlarged cross section of Fig. 1 as seen from the lines 4—4 thereof, and Fig. 5 is a side elevation partly in section showing a slightly modified construction of my jack device.

In Fig. 1 the forward end of the frame of the machine is shown at 1, front axle 2, road spring 3, front wheel 4 resting on the ground 5, and my jack arm 6 in position.

The jack arm 6 is pivotally mounted on a horizontally extending bolt 7 in a bracket 8 bolted to the spring 3 by means of bolts 9, 9', the latter preferably being an extension from the transverse bolt 7 which pivots the jack arm to the bracket.

At the free end of the arm 6 is a ground shoe 10 pivotally secured to the arm by a transversely extending bolt 11, and when the jack is not in use the extreme end of the shoe 10 is suspended from the forward portion of spring 3 by means of a transversely extending bolt 12 passing through the sides of the shoe and through a small clip 13 which may either surround the spring 3 or be secured thereto.

The jack when not in use for jacking up the wheel and secured by the bolt 12 as above described lies under the spring 3 as shown in Fig. 1, and in order to prevent the parts from rattling I provide a small auxiliary spring either of the leaf or coil variety bearing against the road spring 3 and the arm 6 so as to resiliently force them apart and yet permit flexing of the road spring. Such an auxiliary spring is shown at 14 in Fig. 2 wherein it will be seen to have a curved upper end bearing against the road spring and riveted at its lower end to the arm 6.

Arm 6 and ground shoe 10 are both of channel form and the sides of the ground shoe straddle the sides of the arm in such a manner as to permit limited pivotal movement of shoe 10 on arm 6, or until the outer web of these devices contact as shown in the lowermost dotted position 6'' in Fig. 1.

The ground shoe 10 also is provided with small ribs or teeth 15 on its outer surface and is curved as shown best in Fig. 2 for a purpose to be later explained.

The upper end of arm 6 which is pivoted to the bracket 8 passes within the two outer sides of the bracket so as to be effectually braced against sidewise deflection, and when in the lowermost position as dotted at 6'' in Fig. 1 contacts with the rear wall of the bracket so that it can go backward no further than the position shown.

In the modified form of my device shown in Fig. 5 the bracket is designated 18, the securing bolts 19, and jack leg or arm 16. In this form the ground shoe portion 10' is made integral with the leg portion instead of being pivotally attached thereto as shown in Figs. 1 and 2, and the device is curved at 17 and provided with a rough portion or teeth 15'. In this showing the pivotal connection of the arm 16 to the bracket 18 is effected by extending the web of the arm and curling it around a pivotal bolt 19' like an ordinary door hinge.

When the device stands beneath the spring so as to take the weight of the machine a vertical line (designated 20 in Fig. 5) drawn through the upper pivotal connection of the arm 16 will intersect a short flat portion 21 of the ground shoe section when the same is resting firmly on the ground, so that the weight of the automobile will thus rest upon the device without any tendency to tip the same either forward or backward.

It is the intention to apply one of the devices to the spring or frame of the machine adjacent each wheel in the general manner shown in Fig. 1, and when it is desired to lift either of the wheels to repair a flat tire or what not the automobile is stopped, the bolt 12 removed, and the desired device is allowed to fall to the ground to the position dotted at 6' in Fig. 1, the relative position of the ground then being along the dotted line 5' on account of the flat tire. When in this position the machine is then rolled forward very slowly under its own power and in so doing the teeth 15 will grip the earth so as to straighten the device under the spring to the position dotted at 6'' in Fig. 1, the level of the earth then taking the relative position dotted at 5'' with the wheel completely elevated therefrom so as to enable one to remove the wheel or repair the tire as may be desired.

The modification shown in Fig. 5 operates in the same manner, but the advantages of the design having the pivoted ground shoe 10 are, first that it will lie closer to the spring when in inoperative position, and secondly when dropped to the ground the shoe will conform to the ground level so that the teeth 15 will be in best position for engaging the surface of the ground and thereby prevent initial slippage.

It is apparent that modifications may be made in the structure while keeping within the spirit of the invention, for while I show a bracket 8 which is best made of sheet steel, it is manifest that this may be otherwise produced as by a casting, and it is also evident that while I show the bolts 9 and 9' as being U bolts with the cross run of the bolt 9' also serving as the upper pivotal bolt of the arm 6, that these bolts may be otherwise attached to the bracket, either with heads as shown in Fig. 5, or they may be welded directly to the bracket, or any other approved manner of fastening the bracket to the spring or axle may be used.

Having thus described my invention I claim:

1. In an automobile jack, a supporting arm, means pivotally mounting one end of the arm to the vehicle comprising a bracket adapted to be bolted to a road spring of the vehicle adjacent the axle of the vehicle, said arm adapted to swing from a substantially vertical wheel elevating position to a substantially horizontal position upward under the road spring, a curved shoe-like portion pivotally secured at one of its ends adjacent the free end of said supporting arm, means for supporting the free end of the arm including the shoe-like portion pivotally secured thereto, from the road spring, said means comprising a bracket secured to the road spring and adapted for bolting directly to the free end of said shoe-like portion when the arm is in the last mentioned position.

2. In a structure as specified in claim 1, resilient means interposed between said road spring and the free end of said arm adapted to take up any lost motion when the arm is supported by the road spring, said means carried by the arm at the extremity of its free end.

HARRY L. DAHNEKE.